United States Patent [19]

Ludwig

[11] 4,444,592

[45] Apr. 24, 1984

[54] PIGMENT COMPOSITIONS AND PROCESSES THEREFOR

[75] Inventor: Thomas E. Ludwig, Chicago Heights, Ill.

[73] Assignee: The Sherwin-Williams Company, Cleveland, Ohio

[21] Appl. No.: 441,840

[22] Filed: Nov. 15, 1982

Related U.S. Application Data

[63] Continuation-in-part of Ser. No. 269,441, Jun. 2, 1981, abandoned, which is a continuation of Ser. No. 66,907, Aug. 16, 1979, abandoned.

[51] Int. Cl.$^3$ .............................................. C09D 11/00
[52] U.S. Cl. ....................................... 106/23; 106/22; 106/288 Q; 106/289; 106/309
[58] Field of Search ..................... 106/22, 288 Q, 289, 106/23, 309

[56] References Cited

U.S. PATENT DOCUMENTS

| | | | |
|---|---|---|---|
| 1,653,851 | 12/1927 | Hartmann | 106/289 |
| 1,912,421 | 6/1933 | Zschimmer | 106/289 |
| 2,983,756 | 5/1961 | Kranz | 260/570 |
| 3,582,381 | 6/1971 | Papenfuss et al. | 106/288 Q |
| 3,635,745 | 1/1972 | Rentel et al. | 106/309 |
| 3,652,602 | 3/1972 | Schafer et al. | 260/391 |
| 4,142,914 | 3/1979 | Bast et al. | 106/288 Q |

Primary Examiner—John Kight, III
Assistant Examiner—Amelia B. Yarbrough
Attorney, Agent, or Firm—Robert E. McDonald; James V. Tura

[57] ABSTRACT

This invention relates to novel pigmentary products, particularly valuable in the textile art, prepared by using strong acid solvents to solubilize or form fine colloidal dispersions of normally water-insoluble aryl pararosanilines in an aqueous medium. The aryl pararosaniline which is thus solubilized or dispersed is reacted with a heteropoly acid to produce water-insoluble blue-hued pigments. By various modifications in the process, the pigments can be co-precipitated with other pigments and/or dyes to produce pigments or pigment lakes of different shades and intensities.

25 Claims, No Drawings

PIGMENT COMPOSITIONS AND PROCESSES THEREFOR

CROSS REFERENCE TO RELATED APPLICATIONS

This application is a continuation-in-part of application Ser. No. 269,441 filed June 2, 1981, now abandoned, which was in turn a continuation of application Ser. No. 066,907 filed Aug. 16, 1979, now abandoned.

FIELD OF THE INVENTION

This invention relates to blue-hued pigments which are the reaction product of water-insoluble aryl pararosaniline compounds and heteropoly acids (illustratively phosphomolybdic acid or phosphotungstic acid) and the process of their manufacture. Commercially feasible yields of these reaction products are made possible by solubilizing or making a fine colloidal suspension of a normally water-insoluble pararosaniline compound in an acid solvent and reacting the dissolved or finely dispersed pararosaniline compound with an approximately chemically equivalent amount of at least one heteropoly acid. The pigments of this invention have special utility in the fields of textiles and printing inks.

BACKGROUND

The use of sulfonic acid functional pararosaniline compounds, as blue-hued pigments, is known in the art. Representative examples of the use of pigments are given in U.S. Pat. Nos. 3,582,381; 3,635,745 and 3,652,602, as well as other patents and publications.

The use of heteropoly acids as a reactant in combination with a basic dye in the form of its water-soluble chloride or sulfate salt is also known. By prior art processes, fugitive basic dyes such as Methyl Violet and Rhodamine in the form of their water-soluble chloride or sulfate salts are dissolved in water and reacted with a heteropoly acid aqueous solution to produce salts in high yield. These salts are valuable as pigments because of considerably increased lightfastness, very low solubility in water and organic solvents, good brightness and good color intensity. This process, however, cannot be applied to the water-insoluble aryl pararosanilines of this invention because these compounds and their salts are substantially insoluble in water. Alternative methods, such as dissolving the aryl pararosanilines in a common organic solvent, e.g. ethanol, acetic acid, dimethylformamide, dimethylsulfoxide, etc. before adding the heteropoly acid yield a relatively low degree of conversion to the heteropoly acid salt and as such are not commercially feasible. The new pigments and processes described herein overcome these problems by dissolving the pararosaniline compound in a special solvent, in particular a strong acid or a blend of strong acids, to improve its water solubility or dispersibility to yield a high degree of conversion to the heteropoly acid salt. The strong acids will typically have a $pK_a$ of less than about 3.0.

The pigments produced by this invention provide another advantage over the prior art in that they provide an excellent match for Indigo dye as used in the blue denim market. Blue products known in the prior art such as Phthalocyanine Blues and Dianisidine Blues, are unsatisfactory as a replacement for Indigo dye for the blue denim market. That is because the prior art blue products fail to produce satisfactory shade matches for the various standard Indigo blue colors and, also importantly, the prior art blue products will not wash and bleach out on repeated washings similarly to Indigo to meet the qualities demanded in the "blue jean" market. Within the scope of this invention, however, there are several possible ways to produce the proper shade of blue and still provide the correct magnitude of fading upon repeated washings. At least one way this has been accomplished within this invention involves replacing a portion of the water-insoluble aryl pararosaniline compound with a minor quantity of Methyl Violet basic dye, blending these dyes with a Phthalocyanine Blue and solubilizing them in a strong acid solvent prior to reaction with a heteropoly acid and thereafter co-precipitating the components as water-insoluble pigments. Optionally, darker shades of indigo can be matched by co-precipitating minor amounts of a water-insoluble black pigment together with the other pigments.

SUMMARY

It is an object of this invention to provide pigments based principally on the reaction product of a water-insoluble aryl pararosaniline dye and a heteropoly acid. Another object of this invention is to provide a novel process for producing pigments involving the use of strong acids as solvents to improve the solubility of relatively insoluble reactants. Stil another object of this invention is to provide novel pigments by a process which allows the addition of basic dye-heteropoly acid salts, or dyes or pigments of other chemical types to the pararosaniline heteropoly acid salts of this invention. A further object of this invention is to provide a blue-hued pigment which is extended or laked in conjunction with an inert pigment. A more limited object of this invention is to provide an acceptable color match for Indigo dye for the blue denim market. These and other objects of the invention will be apparent from the following description.

As used in the practice of this invention, the water-insoluble aryl pararosaniline compound which can be reacted with the heteropoly acid refers to compounds of the following general formula:

Carbinol Form

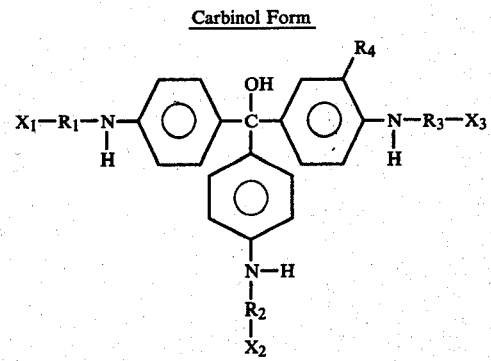

or their corresponding essentially water-insoluble Salt Form (representatively displayed in one of its resonance structures):

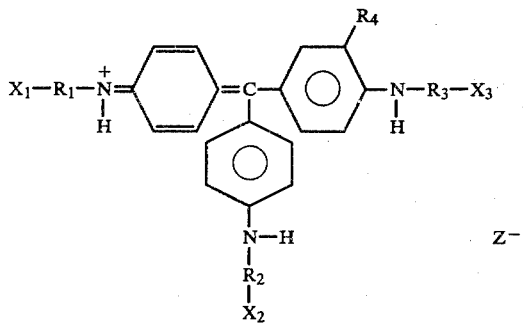

wherein $R_1$, $R_2$ and $R_3$ are direct linkages, phenyl, or napthyl groups; $R_4$ is hydrogen or methyl; $X_1$, $X_2$ and $X_3$ are hydrogen, halogen, nitro, alkyl of 1 to 4 carbons or alkoxy of 1 to 4 carbons; and Z is an anion; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage.

The manufacture of these water-insoluble aryl pararosaniline compounds can be accomplished by methods well known in the art, such as those representatively taught in U.S. Pat. Nos. 3,671,553 and 3,925,094. Therefore, the aryl pararosanilines utilized herein can be manufactured, for example, by the following representative methods:

1. By the reaction of rosanilines with primary aromatic amines in the presence of acid catalysts (especially benzoic acid), wherein an amine solution of the color bases is directly obtained (cf. Fierz-David, Kunstl. organische Farbstoffe 1926, page 262 and BIOS Final Report 1433, page 30 et seq.);
2. By the conversion of amine solutions of the color base-tetrachloroaluminates, which can be obtained according to German Pat. Nos. 1,098,652, 1,161,370 and 1,161,371 or Belgian Pat. No. 718,410, by reacting 4,4',4''-trichlorotrithyl or 4,4'-dichlorotrithyl-tetrachloroaluminates with primary aromatic amines, by means of aqueous alkali metal hydroxide solution into the amine solution of the free color bases. This produces the aryl pararosaniline compound as a solution in the remaining excess amine;
3. By the reaction of diphenyl amines with aromatic carboxylic acids or their functional derivatives (for example, benzotrihalides, anhydrides or acid halides) in the presence of acid catalysts and subsequent treatment with an aqueous alkali metal hydroxide, whereupon solutions of the color bases are obtained in the aromatic amine used in excess.

These reactions will normally produce aryl pararosanilines which are mixtures of the mono, di and triphenyl-pararosanilines or, if substituted aromatic amines are used, will produce the mixed mono, di and triphenyl substituted pararosanilines such as mixed mono, di and tri(meta-chlorophenyl)-pararosanilines; and the mixed mono, di, and tri(meta-tolyl)-pararosanilines and so forth. Either the mixed compounds or any of the single species, e.g. the triphenylpararosaniline, can be used in this invention. Since the preparation of the pararosaniline compounds typically produces a mixture of mono, di and tri aryl substituents, the mixed components are especially convenient starting materials.

The reaction of the aryl pararosaniline and the heteropoly acid in the presence of the strong acid solvent produces a pararosaniline/heteropoly acid salt precipitate having excellent utility as a pigment.

The strong acid solvents which are useful in this invention are those which when used singly or in combination with other solvents have the property of increasing the aqueous solubility of the essentially water-insoluble or only slightly water-soluble pararosaniline dyes, or of forming colloidal or fine aqueous dispersions or emulsions of the same, thus yielding good reactivity with aqueous heteropoly acid solutions. Although these solvents could include a broad variety of chemical compounds, the compounds especially suited for use in this invention are the organic sulfonic acids and inorganic sulfur and phosphorous containing acids.

Representative examples of useful sulfonic acids include p-ethylbenzene sulfonic acid, p-toluenesulfonic acid, benzene-sulfonic acid, xylenesulfonic acid, dodecylbenzenesulfonic acid, isopropylbenzenesulfonic acid, naphthalene-2-sulfonic acid, and methane sulfonic acid. Useful inorganic acids include sulfuric acid, phosphoric acid and especially blends of sulfuric acid and phosphoric acid (especially when modified by the addition of water and usually a surfactant), and mixtures of the above.

When used as a combination, the relative proportions of any of the acid solvents to any other acid solvent is not especially critical and the proportions can range from 0 to 100% for any of the solvents in the combinations. Preferably, when a blend of sulfuric acid and phosphoric acid is used as the solvent, 20 to 95% and most preferably 50 to 90% by weight of the blend should be sulfuric acid. This blend could be used in any proportion with other effective solvents in a combination. The acid solvent should be present in an amount ranging from about 1 to 40 parts by weight solvent for each one part by weight of the pararosaniline compound.

As used herein, the term heteropoly acid refers to acids of molybdenum and/or tungsten generally which also contain one or more atoms of other elements in addition to molybdenum or tungsten, oxygen and hydrogen. The other elements typically utilized include phosphorous, silicon, cobalt, vanadium, aluminum, manganese, chromium, nickel, and iron. For further definition; see *ADVANCED INORGANIC CHEMISTRY*, by Cotton and Wilkinson, 3rd Edition, Wiley Interscience pgs. 952–957, the teaching of which is hereby incorporated by reference. The heteropoly acids and their salts are generally formed by the acidification of molybdate or tungstate solutions which also contain other metal ions or oxy anions. Typically an alkali metal (usually sodium) molybdate or tungstate is dissolved in water at temperatures ranging from about 40° to 100° C. Other desired metal ions can be incorporated as their water soluble salts e.g. dissodium phosphate, sodium silicate, sodium aluminate, sodium chromate, sodium vanadate etc. The solution is maintained between about 40° and 100° C. and then acidified, usually with a mineral acid, to an acidic pH, preferably below about 2.5.

Representative examples of heteropoly acids include phosphotungstic acid, silicotungstic acid, cobaltotungstic acid, vanadotungstic acid, aluminotungstic acid, manganotungstic acid, chromotungstic acid, nickelotungstic acid, ferrotunstic acid, phosphomolybdic acid, aluminomolybdic acid, silicomolybdic acid, cobaltomolybdic acid, vanadomolybdic acid, manganomolybdic acid, chromomolybdic acid, nickelomolybdic acid, ferromolybdic acid and many others known within the art. When combinations of heteropoly acids are used within the teachings of this invention, the relative proportions of one heteropoly acid to another is not critical and any proportion comprising from 0 to 100% of any heteropoly acid could be used in a combination.

Optional modifications within the teaching of this invention also include using as a modifier at least one organic basic dye in an amount ranging up to about 50% by weight of the water-insoluble aryl pararosaniline compound. This basic dye can also be reacted with the heteropoly acid during the reaction process. Basic dyes are dye salts having one or more amino or imino groups. These dyes ionize in aqueous solution and the colored component always constitutes the cation portion.

Another modification within the teachings of this invention involves the use of at least one black or chromatic pigment or dye, which can also be added in an amount ranging up to about 50% by weight of the aryl pararosaniline compound.

Still another modification within the teaching of this invention involves allowing the precipitation of the aryl pararosaniline/heteropoly acid salt to take place in the presence of a suspended inert pigment to produce a pigment lake.

Each of the above modifications could be practiced alone or in combination with any of the other modifications of this invention.

Basic dyes which are useful in the practice of the invention to vary the color, intensity, bleach resistance and other properties of the aryl pararosaniline/heteropoly acid salt are generally those which are chemically similar or related to pararosaniline compounds such as the diphenyl methanes (e.g. Basic Yellow 2 (Airamine O)), xanthene (e.g. Rhodanine B), acridine (e.g. Acriflavine), methine (e.g. Basic Red 12), azine (e.g. Basic Red 2) and induline types. Basic dyes which show special utility in this invention as identified by both their Colour Index Identification and their commercial names include: Basic Green 1 (Brilliant Green); Basic Green 4 (Victoria Green S); Basic Blue 1 (Genacryl Blue 6G); Basic Blue 5 (Genacryl Blue 5B); Basic Blue 7 (Victoria Blue BO); Basic Blue 9 (Methylene Blue A); Basic Violet 1 (Methyl Violet Base); Basic Violet 10 (Rhodamine B); and a mixture of basic dyes called Calcozine Black DUX; as well as other basic dyes known within the art. Combinations of the basic dyes could be used in any proportion with respect to each other.

Chromatic pigments and dyes which are useful in the practice of this invention to modify the color or performance of the aryl pararosaniline/heteropoly acid salt include various dyes and pigments other than basic types such as azo, phthalocyanine, carbazole, quinacridone, indigoid and others. Representative examples of dye and pigment modifiers within this class which have shown particular utility in the practice of this invention include Pigment Blue 15 (Phthalocyanine Blue); Pigment Blue 16 (Phthalocyanine Blue); Pigment Blue 25 (Dianisidine Blue); Pigment Green 7 (Phthalocyanine Green); Pigment Violet 19 (Quinacridone Violet); Pigment Violet 23 (Carbazole Violet); Vat Blue 1 (Indigo) and other materials known in the art. For the purposes of this invention any proportions of these materials could be used in a combination.

In the preferred process for practicing this invention, about 1 to 40 parts of an acid solvent are mixed with about 0 to 100, and preferably 0 to 10 parts of water and heated to about 80° to 105° C. About one part of a reactant mix which comprises about 50 to 100% of the water-insoluble aryl pararosaniline compound, about 0 to 50% of a basic dye and about 0 to 50% of a black or chromatic dye or pigment is added to the solvent over about a 10 to 15 minute period under agitation and heated for roughly an additional 30 minutes. Optionally, about 0 to 1 part of a surfactant may also be added to the solution. The term "part" means parts by weight.

This solvent solution or dispersion is added to a separately prepared aqueous heteropoly acid solution to obtain the desired pararosaniline/heteropoly acid salt product. The amount of aqueous heteropoly acid solution used should provide about 0.5 to 2 chemical equivalents of heteropoly acid to every one chemical equivalent of base provided by the combination of the pararosaniline compound plus any other basic dye. Preferably, the ratio of chemical equivalents of heteropoly acid to the total chemical equivalents of the pararosaniline and the basic dye should be about 1 to 1. Depending on the equivalent weights, the weight of heteropoly acid would normally be at least equal to the weight of the pararosaniline compound and could be as high as 200% of that weight or more.

The agitation is continued and the pigment slurry is heated to about 95° to 100° C. and held in this range for about twenty minutes. An effective temperature for the reaction is between about 60°–110° C. Cold water is then added to reduce the temperature to about 75° C. The pigment is then filtered and washed with water of about 60° C. until the pigment is substantially free of solvent and impurities.

The selection of a surfactant does not appear to be critical. It appears that anionic, cationic, nonionic and amphoteric surfactants could be properly selected for use in this invention. The amount of water used with the acid solvent also does not appear to be critical, although it appears that the dyes are solubilized better in higher concentrations of the acid solvent which, in turn, leads to higher product yields. When high concentrations of solvent are used, it may be economically practical to recover the solvent from the solution by distillation or other means after the pigment has precipitated out.

As mentioned, when a blend of sulfuric acid and phosphoric acid are used as the acid solvent, preferably 50 to 90% by weight of the blend should be sulfuric acid. The addition of phosphoric acid to the sulfuric acid improves the degree of conversion to the heteropoly acid salt over the use of sulfuric acid alone, and the further addition of water and a surfactant is still more effective. The addition of at least 10% and preferably between 10 to 30% water based on the total weight of acid to this blend also minimizes the sulfonation of the pararosaniline compound which objectionally occurs with sulfuric acid alone. Sulfonation of the pararosaniline compound appears to produce a pigmentary product with excessive and objectionable water bleed. Other strong acids could also be used in conjunction with the sulfuric acid or phosphoric acid as long as the combination effectively acts as a solvent for the normally water-insoluble aryl pararosaniline compounds.

The unique solvating effects of the materials used in this process make it especially suited for the use of black or chromatic pigments and dyes in conjunction with the aryl pararosaniline compounds. For example, one useful modification of this process involves the addition of a water-insoluble black pigment or dye to the acid solution of the aryl pararosaniline. The black becomes an integral part of the product co-precipitate after the reaction of the pararosaniline compound with the heteropoly acid to produce a blue-black pigment. Another useful variation involves making the blue-hued pararosaniline/heteropoly acid salt as hereinbefore described and reslurrying it in water. A water soluble black dye is then dissolved in the slurry and then precipitated out, e.g. as an insoluble metal salt to form a blue-black co-precipitate.

Representative examples of water-insoluble black dyes and pigments which have been especially useful in the practice of the invention include Nigrosin SSB (Solvent BLacks 5 and 7) of American Cyanamid, Aniline Black (Pigment Black I) by BASF, Pigment Black X-801, Sulfur Black I, Intraplast Black RL by Crompton and Knowles (Solvent Black 29) and other related materials.

Representative examples of water-soluble black dyes which are especially useful when precipitated as a water-insoluble material within the teachings of this invention include Acid Black 2 (sulfonated acid black (American Cyanamid—Nigrosine 02P); Direct Black 38 (G.A.F. Phenamine Black E-200); Mordant Black II (G.A.F. Chromagene Black T-160); Acid Black I (Calcozine Blue Black FM); Direct Black 38 (Crompton and Knowles—Direct Black E); Acid Black 52 (C and K Intrachrome Black WA); Acid Black 107 (C and K Intralan Black BGL; (Direct Black 19 (I.C.I. Chlorazol Black BV); Acid Black 172 (Verona, Telon Black ID); Sulfur Black 1 (American Cyanamid, Soluble Black R) and other related water-soluble black materials.

Although other modes of incorporating the water-soluble black materials are not precluded, the best mode we have found involves adding the water-soluble black material to an aqueous slurry of the pararosaniline/heteropoly acid salt, heating to fully dissolve the black material and then precipitating the black by reacting it with a metal chloride such as barium chloride, or with an amine salt such as trimethyldodecylammonium chloride or the like. The pigmentary products of this invention include water-insoluble, homogenous co-precipitates of the foregoing selected reactants.

Another advantageous method to practice this invention is to prepare pigments in the manner hereinbefore described but with the addition of about 0.25 to 2 parts of an inert extender pigment to about one part of blue or blue black to form pigment lakes of enhanced color intensity. Although the use of extender or laking pigments has been known in the art, the use of laking within this invention has produced color intensitites which are 25 to 50% higher than the unlaked pigments and this improvement is most unexpectedly high. Lakes involve the precipitation of the colored pigment on an inert extender pigment. Although it is not our intention to be bound by theory, it is postulated that when the reactants plus extender are added to the heteropoly acid solution the pigment composition is precipitated and bonded onto the extender particle surface as a fine coating thereby producing the 25 to 50% gain in color intensity.

Suitable extenders include as illustrative: China clay or kaolin (hydrated aluminum silicate) including water processed, calcined, delaminated and surface treated types; talc (hydrated magnesium-aluminum silicate) of various types; fullers earth (hydrous aluminum-magnesium silicate) of various types; bentonite (hydrous aluminum plus minor amounts of other metal silicates); silica of natural and synthetic types; sodium aluminosilicate (e.g. Zeolox 80 made by J. M. Huber); blanc fixe (barium sulfate); wollastinite (calcium silicate); nephaline syenite (anhydrous sodium potassium aluminum silicate); mica (hydrous aluminum potassium silicate); and other materials known within the art.

DESCRIPTION OF THE PREFERRED EMBODIMENTS

The pigments of this invention have particular utility in slasher dyeing, pad dyeing, dope dyeing and fabric printing processes presently in use in the textile arts. It is expected that the pigmentary colorants of this invention will also be useful in printing inks, plastics, paints and decorative coatings, etc.

The following examples have been selected to illustrate specific embodiments and practices of advantage to a more complete understanding of the invention. In the following examples, unless otherwise stated, figures given represent parts by weight and comparative ratings of bleach resistance were determined from the IVA Detergent plus bleach washfastness test (AATCC Test Method 61-1972).

The short explanations which precede some of the examples are inserted for the sake of clarity only and are not intended to limit the teachings of any of the examples.

EXAMPLE 1

To 840 parts of solvent p-ethylbenzenesulfonic acid (EBSA) is added 42 parts of water. While stirring, the temperature is raised to about 105° C. and 35 parts of an aryl pararosaniline comprising mixed mono, di and triphenyl pararosanilines is added over a 10 to 15 minute period. A temperature of 105° C. to 110° C. is maintained while continuing good agitation for a 30 minute period.

Separately, a heteropoly acid solution of phosphomolybdic acid (PMA) is prepared by adding 47.5 parts of anhydrous sodium molybdate and 5 parts of anhydrous disodium phosphate to 2100 parts of water at 75° C., stirring to solution, and then adding 58 parts of 31.5% hydrochloric acid to a pH of about 1.8.

Next, the aryl pararosaniline solution in the EBSA at 105° C. is added over a 6 to 7 minute period to the heteropoly acid solution at 75° C., while continuing good agitation and allowing the temperature to rise to about 88° C. The resulting aryl pararosaniline-PMA salt pigment slurry is then heated to the boil, held at the boil for 20 minutes, and cold water is added to reduce the temperature to about 75° C. The pigment is then filtered and washed with water of about 60° C. temperature until it is substantially free of solvent and inorganic salts. There is thus obtained 64.4 parts of a bright red shade blue pigment of high color strength and very good lightfastness which is very well suited for textile, printing ink and other applications.

The product may be utilized as the aqueous filter cake to produce aqueous dispersions or flushed into a suitable vehicle. Alternatively, the product may be used as a dry powder produced either by spray drying or by kiln drying and pulverizing. If desired, the EBSA can be recovered substantially unchanged from the pigment filtrate by distillation or other means known within the art.

EXAMPLE 2

Prepared as in Example 1, but 76.4 parts by weight of sodium tungstate dihydrate was used to prepare the heteropoly acid, phosphotungstic acid (PTA). There is obtained 82.5 parts of a red shade aryl pararosaniline-PTA blue pigment comparable to the product of Example 1, but slightly to moderately brighter and redder, and moderately weaker in color strength.

EXAMPLE 3

In like manner to Example 1, but the sodium molybdate is reduced to 23.8 parts and 38.2 parts of sodium tungstate dihydrate is added to produce phosphomolybdotungstic acid (PMTA). There is obtained 72.6 parts of a red shade aryl pararosaniline-PMTA pigment comparable to the product of Example 1, but slightly brighter, redder and weaker in color strength.

Examples 4, 5, 6 and 7 show generally the use of a similar process but involving selected representative substituted pararosaniline compounds.

EXAMPLE 4

In like manner to Example 1, a pigmentary product is prepared by replacing the mono, di and triphenyl pararosanilines with 37.5 parts of mixed mono, di and tri (m-tolyl)-p-rosaniline. There is obtained 68.8 parts of a medium red shade blue pigment comparable to the product of Example 1, but moderately greener in shade.

EXAMPLE 5

In like manner to Example 1, a substituted pigmentary blue is prepared by replacing the mono, di and triphenyl pararosanilines with 39.2 parts of mixed mono, di and tri (m-chlorophenyl)-p-rosaniline. There is obtained 69.6 parts of a medium red shade blue pigment comparable to the product of Example 1, but somewhat greener in shade.

EXAMPLE 6

In like manner to Example 1, a pigmentary blue product is prepared by replacing the mixed mono, di and triphenyl-pararosaniline with 40 parts of mixed mono, di and tri-p-methoxyphenyl-pararosaniline. There is obtained 70.2 parts of a blue pigment comparable to the product of Example 1.

EXAMPLE 7

In like manner to Example 1, a pigmentary blue product is obtained by replacing the mixed mono, di and triphenyl-pararosaniline with 40.6 parts of mixed mono, di and tri-p-nitrophenyl-pararosaniline. There is obtained 70.6 parts of a blue pigment comparable to the product of Example 1.

Examples 8, 9 and 10 show generally the use of other representative selected solvents in a process similar to Example 1.

EXAMPLE 8

As in Example 1, a pigmentary blue product is prepared by replacing the EBSA of that Example with a like amount of p-toluenesulfonic acid. There is obtained 62 parts of pigment very similar in properties to the product of Example 1, except it is slightly weaker in color strength.

EXAMPLE 9

As in Example 1, a pigmentary blue product may be prepared by replacing the p-ethyl-benzenesulfonic acid (EBSA) with a like amount of benzenesulfonic acid. There is obtained 54 parts of a product generally similar to the product of Example 1.

EXAMPLE 10

In like manner to Example 1, an aryl pararosaniline/heteropoly acid salt may be prepared by replacing the p-ethyl-benzenesulfonic acid with 505 parts p-toluene sulfonic acid plus 335 parts xylene sulfonic acid. There is obtained 67 parts of a pigment close in properties to the product of Example 1, but slightly weaker in color strength.

Examples 11 to 13 illustrate generally the use of basic dyes in conjunction with the aryl pararosaniline.

EXAMPLE 11

In like manner to Example 1, a modified pigmentary blue product may be prepared by using 30 parts of the mixed aryl pararosaniline of Example 1 plus 3.6 parts Methyl Violet Base. There is obtained 68.7 parts of a red shade blue pigment comparable to the product of Example 1, but slightly redder and having improved resistance to sodium hypochlorite bleaching.

EXAMPLE 12

In like manner to Example 1, a modified pigmentary blue product may be prepared by using 30 parts of the mixed aryl pararosanilines of Example 1 plus 5 parts Victoria Green S. There is obtained 68.6 parts of a medium green shade blue pigment comparable to the product of Example 1, but having improved bleach resistance.

EXAMPLE 13

In like manner to Example 1, a modified pigmentary blue product may be prepared by using 28 parts of the mixed aryl pararosanilines of Example 1 plus 7 parts Victoria Blue BO. There is obtained 69.6 parts of a red shade blue pigment comparable to the product of Example 1, but somewhat greener in shade and having improved bleach resistance.

Examples 14 and 15 are illustrative of the use of some of the chromatic dyes or pigments in conjunction with the aryl pararosaniline.

EXAMPLE 14

In like manner to Example 1, a modified pigmentary blue color product was prepared by adding, in addition to the mixed aryl pararosaniline, 24 parts of crude Phthalocyanine Blue. There is obtained 88 parts of a medium red shade blue pigment generally comparable in properties to the product of Example 1, but moderately greener in shade and having significantly improved resistance to bleaching. In this preparation, various types of crude Phthalocyanine Blue may be used including unmodified, partially chlorinated and/or sulfonated Copper Phthalocyanine, metal-free phthalocyanine, mixtures of these types, etc.

EXAMPLE 15

In like manner to Example 1, a modified product is prepared by adding, in addition to the mixed aryl pararosanilines, 12 parts of Indigo dyestuff. There is obtained 76 parts of a red shade blue pigment generally comparable in properties to the product of Example 1, but slightly greener and duller in shade and having definitely improved bleach resistance.

Example 16 is illustrative of the use of basic dyes and a chromatic pigment in combination with the aryl pararosanilines.

EXAMPLE 16

In like manner to Example 1, a modified blue pigment product is prepared by using 31.5 parts of the mixed aryl pararosanilines of Example 1, 2.6 parts Methyl Violet Base and 24 parts of crude Copper Phthalocyanine Blue. There is obtained 91 parts of a medium red shade blue pigment generally comparable in properties to the product of Example 1, but moderately greener in shade and considerably improved in bleach resistance.

EXAMPLE 17

A modified blue pigmentary product is prepared in like manner to Example 16, except that no water is added to the EBSA. There is obtained 92 parts of a product close in all properties to the product of Example 16, except that it is 10% weaker in color strength.

EXAMPLE 18

The process of Example 1 is duplicated except for inclusion in the acid solvent of a surfactant wherein the ratio of solvent to surfactant was of the order of 50:1 based on active amount of surfactant, and the surfactant was Igepon T-33. About 50 parts additional water was included in the solvent.

There is obtained 77 parts of a medium red shade blue pigment similar to the product of Example 1, except that it is moderately greener and duller in shade, and moderately weaker in color strength.

Examples 19 and 20 are generally illustrative of the use of other heteropoly acids.

EXAMPLE 19

A modified pigmentary product is prepared in like manner to Example 16 except the 5 parts of the anhydrous disodium phosphate is replaced by 10 parts of sodium silicate nonohydrate. There is thus obtained 92 parts of a product generally similar in properties to that of Example 16, but 5% stronger in color intensity.

EXAMPLE 20

A modified pigmentary product is prepared in like manner to Example 16 except the 5 parts of anhydrous disodium phosphate is replaced with 4.5 parts of anhydrous sodium aluminate. There is obtained 90 parts of a product generally similar in properties, but slightly stronger in color intensity than that of Example 16.

Examples 21 through 26 are generally illustrative of the use of a black as one of the color modifiers.

EXAMPLE 21

To 840 parts of p-ethylbenzene sulfonic acid (EBSA) is added 42 parts of water. While stirring well, the temperature is raised to about 105° C. and 35 parts of an aryl pararosaniline comprising mixed mono, di and triphenyl pararosanilines and 32 parts Nigrosine SSB (Solvent Black 5) are added over a 10 to 25 minute period. A temperature of about 105° C. to 110° C. is maintained while continuing good agitation for a 30 minute period.

Separately, there is prepared a phosphomolybdic acid (PMA) solution by adding 47.5 parts of anhydrous sodium molybdate and 5 parts of anhydrous disodium phosphate to 2100 parts of water at 75° C., stirring to solution and then adding 58 parts of 31.5% hydrochloric acid to a pH of about 1.8.

Next the solution of the aryl pararosaniline in the p-ethylbenzenesulfonic acid at 105° C. is added over a 6 to 7 minute period to the PMA solution at 75° C., while continuing good agitation and allowing the temperature to rise to about 88° C. The resulting aryl pararosaniline-PMA pigment slurry is then heated to the boil, held at the boil for 20 minutes and cold water is then added to reduce the temperature to about 75° C. The pigment is then filtered and washes with water of about 60° C. temperature until it is substantially free of EBSA and inorganic salts. There is thus obtained 96.4 parts of a bright red shade blue-black pigment of high color strength and very good lightfastness which is very well suited for textile, printing ink and other applications.

The product may be utilized as the aqueous filter cake to produce aqueous dispersions or flushed into a suitable vehicle. Alternately, the product may be used as a dry powder produced either by spray drying or by kiln drying and pulverizing.

EXAMPLE 22

The process of Example 21 is repeated except the pararosaniline and the Nigrosine are replaced with 31.5 parts of the mixed aryl pararosaniline of Example 21, 2.6 parts Methyl Violet Base, 24 parts crude phthalocyanine blue and 32 parts Nigrosine SSB to the EBSA. This yields 123 parts of blue-black similar to Example 21 except greener in shade and considerably improved in bleach resistance.

EXAMPLE 23

A finished blue is first made as in Example 16. The still water wet pigment filter cake (containing 91 parts blue on the dry basis) is reslurried well using a Waring Blender, Cowles or other suitable disperser and adding sufficient water for proper dispersion viscosity, as is well known in the art. The pigment slurry was then diluted with water to a total of 1200 parts and 16 parts Direct Black E (Direct Black 38—Crompton and Knowles) was added. The mixture was stirred to solution while heating to 83° C. Next a solution of 12 parts barium chloride dihydrate in 100 parts water was added, thus precipitating the black as a substantially water-insoluble barium salt. The product was recovered by filtering and washing with water until essentially free of inorganic salts. There is thus obtained 104 parts of substantially homogenous blue-black pigment of generally very good physical properties, and which is well suited for textile, printing ink and other applications.

EXAMPLE 24

The process of Example 23 is repeated substituting 24 parts Nigrosine 02P (Acid Black 2, American Cyanamid) for the Direct Black E, and aluminum sulfate for the barium chloride. There is obtained 104 parts of a blue-black similar in properties to the product of Example 23.

EXAMPLE 25

The process of Example 23 is repeated substituting 24 parts Nigrosine 02P for the Direct Black E and 12 parts Arquad 12-50 (50% solution of tri-methyldodecylammonium chloride-Armak Co.) for the barium chloride. There is obtained 112 parts of a blue-black pigment generally similar to the product of Example 23.

EXAMPLE 26

The process of Example 23 is repeated substituting 26 parts Soluble Black R (soluble form of Sulfur Black 1—American Cyanamid) for the Direct Black 1. Instead of precipitating with barium chloride, the black is precipitated by adding hydrochloric acid to a pH of 3.0 to 4.0. There is obtained 103 parts of a blue-black generally similar in properties to the product of Example 23.

Examples 27 through 40 are generally illustrative of the use of a blend of sulfuric acid and phosphoric acid as the solvent.

EXAMPLE 27

To 350 parts of 93% sulfuric acid under very good agitation, there is added 20 parts of water, 90 parts of 85% phosphoric acid and 17.5 parts of dodecylbenzenesulfonic acid. The temperature is then brought to 80° C. and maintained at 80° C. to 85° C. while adding over a 10 to 15 minute period 35 parts of an aryl pararosaniline comprising mixed mono, di and triphenyl-pararosanilines. Stirring is continued for a 30 minute period at 80° C. to 85° C. in order to obtain substantially complete solution of the aryl pararosaniline.

There is separately prepared a heteropoly acid solution by adding 53 parts of anhydrous sodium molybdate and 5 parts of anhydrous disodium phosphate to 800 parts of water at 50° C., stirring to solution, and adding 65 parts of 31.5% hydrochloric acid to a pH of about 1.8.

Next, the solution of the aryl pararosaniline in the acid solvent blend at 80° C. is added to the PMA solution at 50° C. over a 6 to 7 minute period, while continuing good agitation and allowing the temperature to rise to about 85° C. to 90° C. The resulting pigment slurry is then heated to about 95° C., held 5 minutes at 95° C., and then 600 parts of water of about 60° C. temperature is added over a 4 to 5 minute period while maintaining a slurry temperature of 90° C. to 95° C. The slurry is then boiled for 10 minutes and cold water is added next to reduce the temperature to about 70° C. The pigment is then recovered by filtering and washing with water of about 60° C. temperature until it is substantially free of the solvent acids and the inorganic salts formed during the synthesis.

There is thus obtained 60 parts of a red shade blue pigment having good color intensity, brightness, lightfastness and other physical properties which render it well suited for textile, printing inks and other applications. The high pigment yield obtained indicates a relatively high degree of conversion of the aryl pararosaniline to the heteropoly acid salt.

EXAMPLE 28

Like Example 27, except 35 parts of the mixed aryl pararosaniline was dissolved in 280 parts 93% sulfuric acid, 28 parts of water, 70 parts of 85% phosphoric acid and 14 parts DDBSA. (DDBSA is dodecylbenzenesulfonic acid). There is obtained 59 parts of a product very similar to that of Example 27.

EXAMPLE 29

Like Example 27, except 35 parts of the mixed aryl pararosaniline was dissolved in 210 parts 93% sulfuric acid, 20 parts of water, 140 parts of 85% phosphoric acid and 14 parts DDBSA. There is obtained 59 parts of a product very similar to that of Example 27.

EXAMPLE 30

Like Example 27, except 35 parts of the mixed aryl pararosaniline was dissolved in 280 parts 93% sulfuric acid, 28 parts water, no phosphoric acid and 42 parts DDBSA. There was obtained 50 parts of a product similar to that to Example 27, but weaker in color intensity.

EXAMPLE 31

Like Example 27, except 35 parts of the mixed aryl pararosaniline was dissolved in 280 parts of 93% sulfuric acid, 28 parts of water, 35 parts of 85% phosphoric acid, 42 parts of EBSA and 21 parts of DDBSA. There is obtained 58 parts of a product generally similar to that of Example 27.

EXAMPLE 32

Like Example 27, except 35 parts of the mixed aryl pararosaniline was dissolved in 210 parts of 93% sulfuric acid, 20 parts of water, 140 parts of 85% phosphoric acid and 14 parts of DDBSA. There was also added 6 parts Strodex PK-90 (an organic polyphosphoric ester acid anhydride surfactant) to the heteropoly acid solution. There is obtained 63 parts of a product very similar to that of Example 27.

EXAMPLE 33

Like Example 27, except 35 parts of the aryl pararosanilines was dissolved in 350 parts of 93% sulfuric acid, 20 parts of water, 90 parts of 85% phosphoric acid and 10 parts of Ethoquad 0-25 (a commercial surfactant). There is obtained 60 parts of a product similar to that of Example 27, but having somewhat higher color strength.

EXAMPLE 34

Like Example 27, except 25 parts of the aryl pararosanilines plus 7 parts of Methyl Violet Base is used. There is obtained 63 parts of a product similar to that of Example 27, but moderately redder in shade and having improved bleach resistance.

EXAMPLE 35

Like Example 27, except in addition to the 35 parts of mixed aryl pararosanilines, there is added 24 parts of crude Phthalocyanine Blue. There is obtained 82 parts of a product similar to that of Example 27, but moderately greener in shade and significantly improved in bleach resistance. The crude Phthalocyanine Blue is conditioned to the pigmentary form by the process.

EXAMPLE 36

Like Example 27, except 31.5 parts of the aryl pararosanilines, plus 2.6 parts Methyl Violet Base, plus 24 parts crude Phthalocyanine Blue were used. There is obtained 82 parts of a product similar to that of Example 27, but slightly to moderately greener in shade and considerably improved in bleach resistance.

EXAMPLE 37

The procedure of Example 27 was repeated, except the heteropoly acid was phosphotungstic acid, obtained by replacing sodium molybdate with a chemically equivalent amount of sodium tungstate. Color was slightly to moderately brighter and redder, and moderately weaker in color intensity.

EXAMPLE 38

As in Example 27, however, after all of the aryl pararosaniline has been added to the solvent mixture, 16 parts of Nigrosine SSB (Solvent Black 5) were also incorporated over a 10 minute period. The rest of the procedure follows as in Example 27. There is thus obtained 75 parts of a red shade blue-black pigment having good color intensity, lightfastness and other physical properties which render it well suited for textile, printing ink and other applications.

EXAMPLE 39

A finished blue pigment filter cake (made as in Example 27), containing 60 parts blue pigment on the dry basis, is reslurried well using a Waring Blender, Cowles or other suitable disperser and adding sufficient water for proper dispersion viscosity, as is well known in the art. The pigment slurry is then diluted with water to a total of 1200 parts.

Next is added 24 parts of Chromogene Black T-160 (Mordant Black 11-BASF). While maintaining good agitation, the black dye is dissolved while heating to 83° C. Thereupon, a solution of 18 parts of barium chloride dihydrate in 100 parts of water is added, thus precipitating the black as a substantially water-insoluble barium salt. The product is recovered by filtering and washing with water until substantially free of inorganic salts. There is thus obtained 80 parts of a blue-black pigment generally similar in properties to the product of Example 38.

EXAMPLE 40

A blue-black pigment is prepared as in Example 39, except that 26 parts of Soluble Black R (soluble form of Sulfur Black 1—American Cyanamid) is used in place of the Chromogen Black T-160. Instead of precipitating with barium chloride, the black is precipitated by adding hydrochloric acid to a pH of 3.0 to 4.0. There is obtained 97 parts of a blue-black pigment generally similar in properties to the product of Example 38.

Examples 41 through 55 are generally illustrative of the practice of this invention to produce pigment lakes.

EXAMPLE 41

An aryl pararosaniline-phosphomolybdic acid blue pigment lake is prepared by the process of Example 27 except that the water in the solvent mix is increased to 57 parts. Also, after the mixed aryl pararosaniline there is also added over a 10 minute period 60 parts of Hydrite R china clay (a water-processed kaolin made by Georgia Kaolin Co.), which is dispersed in the solvent.

There is thus obtained 120 parts of a red shade blue pigment lake comprising a substantially homogenous coprecipitate of 50% blue toner and 50% china clay. The product is generally similar in physical properties to the blue toner of Example 27, but somewhat greener and brighter in shade and about 30% higher in color strength when compared on an actual blue toner content basis.

EXAMPLE 42

A blue pigment lake is prepared as in Example 41, except that there is used 31.5 parts of the aryl pararosaniline, plus 2.6 parts Methyl Violet base, plus 24 parts crude Phthalocyanine Blue. Also, the china clay is increased to 82 parts. There is obtained 164 parts of a 50% blue toner—50% china clay lake generally similar in properties to the product of Example 41, but slightly to moderately greener in shade and considerably improved in resistance to sodium hypochlorite bleaching.

EXAMPLE 43

A blue pigment lake is prepared as in Example 42, except a phosphotungstic acid rather than a phosphomolybdic acid salt is prepared by replacing the sodium molybdate with 85 parts of sodium tungstate dihydrate. There is obtained 182 parts of a product similar to that of Example 42, but slightly to moderately brighter and redder in shade, and somewhat weaker in color intensity.

EXAMPLE 44

Same as Example 42, except the dodecylbenzenesulfonic acid is replaced with 10 parts of Ethoquad 0-25 and the china clay is increased to 91 parts. There is obtained 182 parts of a product similar to that of Example 42.

EXAMPLE 45

Same as Example 42, except the china clay is reduced to 55 parts. There is obtained 137 parts of a blue lake containing 60% blue toner and 40% china clay. The product is similar to that of Example 42, except that it is slightly redder in shade and weaker in color strength when compared on an actual blue toner content basis.

EXAMPL 46

Same as Example 42, except the china clay is reduced to 35 parts. There is obtained 117 parts of a blue lake containing 70% blue toner and 30% china clay. The product is generally close in properties to that of Example 45 when compared on an actual blue toner content basis.

EXAMPLE 47

Same as Example 42, except the china clay is increased to 152 parts and there is also added along with the china clay an additional 200 parts of 80% sulfuric acid. There is obtained 234 parts of a blue lake containing 35% blue toner and 65% china clay. The product is generally similar to that of Example 42, except that it is slightly higher in color strength when compared on an actual blue toner content basis.

EXAMPLE 48

200 parts on the dry basis of a finished blue pigment lake wet filter cake, comprising 50% blue toner and 50% china clay as prepared in Example 42 is reslurried well using a Waring Blender, Cowles or other suitable disperser and adding sufficient water for proper dispersion viscosity, as is well known in the art. The pigment slurry is then diluted with water to 1200 parts. Next is added 24 parts Chromogene Black T-160 (Mordant Black 11—BASF). While maintaining good agitation, the black dye is dissolved during heating to 83° C. Thereupon, a solution of 18 parts barium chloride dihydrate is added, thus precipitating the black as a substantially water-insoluble barium salt. The product is recovered by filtering and washing with water until substantially free of inorganic salts. There is thus obtained 220 parts of a blue-black pigment lake having very good color intensity, light-fastness and other physical properties which render it well suited for textile, printing ink and other applications.

EXAMPLE 49

Same as Example 48, replacing the Chromogene Black T-160 with 26 parts Soluble Black R (soluble form of Sulfur Black 1—American Cyanamid). Instead of precipitating with barium chloride, the black is precipitated by adding hydrochloric acid to a pH of 3.0 to 4.0. There is obtained 215 parts of a blue-black pigment lake similar to that of Example 48.

EXAMPLE 50

Same as Example 42, except replace the 5 parts of anhydrous disodium phosphate with 9 parts of anhydrous sodium chromate. There is thus obtained 164 parts of a 50% aryl pararosaniline/chromomolybdic acid blue toner—50% china clay lake generally similar to the product of Example 42 in physical properties.

EXAMPLE 51

Same as Example 42, except replace the 5 parts anhydrous disodium phosphate with 4.5 parts of sodium vanadate. There is thus obtained 164 parts of a 50% aryl pararosaniline/vanadomolybdic acid blue toner—50% china lake generally similar in physical properties to the product of Example 42, but 5% higher in color intensity.

EXAMPLE 52

Same as Example 42, except 82 parts of Glomax HE (calcined kaolin, made by Georgia Kaolin Co.) is used as the extender. There is obtained 164 parts of a 50% blue toner—50% kaolin lake generally similar in properties to the product of Example 42 but 20% stronger in color intensity when compared on an actual blue toner content basis. In comparison to the same blue pigment which has not been laked, the product of this example is greener and brighter in shade and 50% higher in tinting strength when compared on actual blue toner content basis.

EXAMPLE 53

Same as Example 42, except 82 parts of No. 399 Lo. Micron Mg Silicate (a talc manufactured by Whittaker, Clark and Daniels, Inc.) is used as the extender. There is obtained 164 parts of a 50% blue toner—50% talc lake similar to the product of Example 42 but 20% stronger on actual blue toner content basis.

EXAMPLE 54

Same as Example 42, except 64 parts of Attasorb LVM Fullers Earth (a calcined low grit product made by Englehard Minerals and Chemicals Corp.) is used as the extender rather than the china clay. There is obtained 142 parts of a 58% blue toner—42% Fullers Earth pigment lake generally similar in properties to the product of Example 42, but 25% stronger in color intensity on actual blue toner content basis.

EXAMPLE 55

Same as Example 42, except the extender is 82 parts of Imsil A-10 amorphous silica (made by Illinois Minerals Co.). There is obtained 164 parts of a 50% blue toner—50% silica pigment lake generally similar in properties to the product of Example 42, but moderately greener and brighter and 10% stronger in color strength.

The foregoing examples, while illustrative are not exhaustive and while this invention has been described by a number of specific embodiments, it is obvious that other variations and modifications may be made without departing from the spirit and scope of the invention as set forth in the appended claims.

The invention claimed is:

1. Blue pigments which comprise the reaction product obtained by dissolving and/or dispersing an essentially water-insoluble aryl pararosaniline in an effective amount of at least one acid solvent and reacting with an approximately chemically equivalent amount of at least one heteropoly acid containing molybdenum and/or tungsten; wherein said aryl pararosaniline has the following structure in its carbinol form:

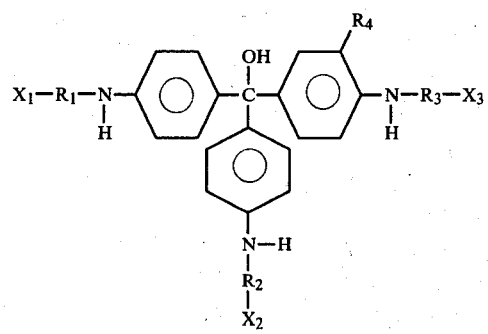

wherein $R_1$, $R_2$ and $R_3$ are direct linkages, phenyl, or napthyl groups; $R_4$ is hydrogen or methyl; $X_1$, $X_2$ and $X_3$ are hydrogen, halogen, nitro, alkyl of 1 to 4 carbons or alkoxy of 1 to 4 carbons; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage.

2. The pigments of claim 1 further characterized in that the heteropoly acid is at least one acid selected from the group consisting of phosphotungstic acid, silicotungstic acid, cobaltotungstic acid, vanadotungstic acid, aluminotungstic acid, manganotungstic acid, chromotungstic acid, nickelotungstic acid and ferrotungstic acid.

3. The pigments of claim 1 further characterized in that the heteropoly acid is selected from the group consisting of phosphomolybdic acid, silicomolybdic acid, cobaltomolybdic acid, vanadomolybdic acid, aluminomolybdic acid, manganomolybdic acid, chromomolybdic acid, nickelomolybdic acid and ferromolybdic acid.

4. The pigments of claim 1 further characterized in that at least one basic dye is present during the reaction in an amount ranging up to about 50% by weight of the aryl pararosaniline.

5. The pigments of claim 4 wherein the basic dye is selected from the group of basic dyes consisting of the diphenyl methane, xanthene, acridine, methine, azine and induline dyes.

6. The pigments of claim 1 further characterized in that at least one chromatic pigment or dye is present in amounts ranging up to about 50% by weight of the aryl pararosaniline.

7. The pigments of claim 6 wherein the chromatic pigment or dye is selected from the group of dyes and pigments consisting of azo, phthalocyanine, carbazole, quinacridone and indigoid.

8. The pigments of claim 1 further characterized in that at least one chromatic pigment or dye is present in an amount ranging up to about 50% by weight of the aryl pararosaniline and at least one basic dye is also present in an amount ranging up to about 50% by weight of the aryl pararosanilines.

9. The pigments of claim 8 further characterized in that the basic dye is methyl violet and the chromatic pigment is copper phthalocyanine.

10. The pigments of claim 1 further characterized in that a black pigment or dye is also present in an amount ranging up to about 50% by weight of the aryl pararosaniline.

11. A laked pigment which comprises the reaction product obtained by dissolving and/or dispersing an essentially water-insoluble aryl pararosaniline in an effective amount of at least one acid solvent and reacting the aryl pararosaniline with an approximately chemically equivalent amount of at least one heteropoly acid containing molybdenum and/or tungsten; wherein said reaction takes place in the presence of a finely dispersed suspended inert pigment; and wherein said aryl pararosaniline has the following structure in its carbinol form;

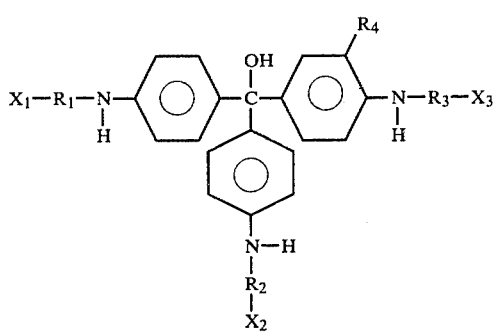

wherein $R_1$, $R_2$ and $R_3$ are direct linkages, phenyl, or napthyl groups; $R_4$ is hydrogen or methyl; $X_1$, $X_2$ and $X_3$ are hydrogen, halogen, nitro, alkyl of 1 to 4 carbons or alkoxy of 1 to 4 carbons; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage.

12. The pigments of claim 11 further characterized in that the inert pigment is selected from the group consisting of china clay, kaolin, talc, fullers earth, bentonite, silica, sodium aluminosilicate, blanc fixe, wollastinite, nephaline syenite, and mica.

13. A process for producing blue pigments which comprises dissolving and/or dispersing an essentially water-insoluble aryl pararosaniline in an effective amount of at least one acid solvent and reacting the aryl pararosaniline with an approximately chemically equivalent amount of at least one heteropoly acid containing molybdenum and/or tungsten; wherein said aryl pararosaniline has the following structure in its carbinol form:

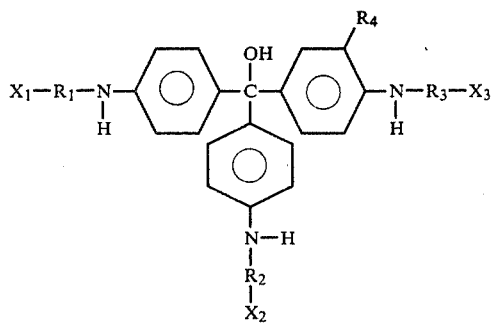

wherein $R_1$, $R_2$ and $R_3$ are direct linkages, phenyl, or napthyl groups; $R_4$ is hydrogen or methyl; $X_1$, $X_2$ and $X_3$ are hydrogen, halogen, nitro, alkyl of 1 to 4 carbons or alkoxy of 1 to 4 carbons; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage.

14. The process of claim 13 further characterized in that the acid solvent has a pKa less than about 3.0.

15. The process of claim 13 further characterized in that the acid solvent is selected from the group consisting of organic sulfonic acids, sulfuric acid, phosphoric acid, and blends thereof.

16. The process of claim 13 further characterized in that the acid solvent is present in an amount ranging from about 1 to about 40 times the weight of the aryl pararosaniline.

17. The process of claim 13 further characterized in that the solvent is a blend of sulfuric acid and phosphoric acid.

18. The process of claim 17 further characterized in that the sulfuric acid comprises 20% to 95% by weight of the solvent combination.

19. The process of claim 18 further characterized in that water is present in an amount ranging from at least about 10% by weight of the acid solvent.

20. The process of claim 19 further characterized in that an effective amount of a surfactant is also present.

21. The process of claim 13 further characterized in that the acid solvent comprises a mixture of at least one sulfonic acid, sulfuric acid, and phosphoric acid.

22. The process of claim 21 further characterized in that water is present in an amount ranging from at least about 10% by weight of the acid solvent.

23. A process for preparing pigments which comprise admixing at an effective temperature:
(a) an aqueous heteropoly acid containing molybdenum and/or tungsten;
(b) a dispersion or solution which comprises:
  (i) about 1 to about 40 parts of an acid solvent;
  (ii) about 0 to 100 parts water;
  (iii) about 1 part of a reactant mixture which comprises
    (I) about 50 to 100% of an aryl pararosaniline having the following structure in its carbinol form:

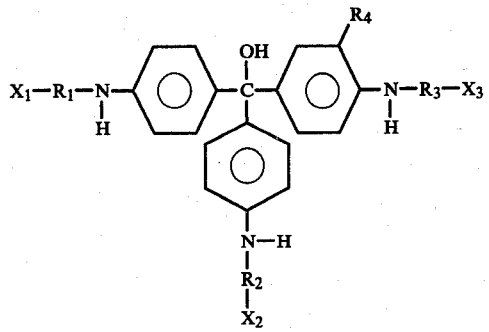

wherein $R_1$, $R_2$ and $R_3$ are direct linkages, phenyl, or napthyl groups; $R_4$ is hydrogen or methyl; $X_1$, $X_2$ and $X_3$ are hydrogen, halogen, nitro, alkyl of 1 to 4 carbons or alkoxy of 1 to 4 carbons; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage;

(II) about 0 to 50% of a basic dye;

(III) about 0 to 50% of a black or chromatic dye or pigment;

(iv) about 0 to 1 part surfactant; wherein the heteropoly acid is present at an approximately chemically equivalent amount to the total equivalents of aryl pararosaniline and basic dye.

24. A process for the production of laked pigments which comprises dissolving or dispersing an essentially water-insoluble aryl pararosaniline in an effective amount of at least one acid solvent and reacting the aryl pararosaniline with an approximately chemically equivalent amount of at least one heteropoly acid containing molybdenum and/or tungsten; wherein said reaction takes place in the presence of a finely dispersed suspended inert pigment; and wherein said aryl pararosaniline has the following structure in its carbinol form:

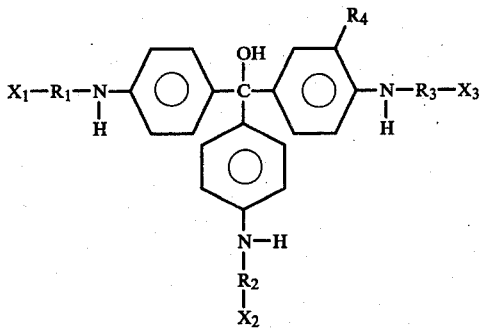

wherein $R_1$, $R_2$ and $R_3$ are direct linkages, phenyl, or napthyl groups; $R_4$ is hydrogen or methyl; $X_1$, $X_2$ and $X_3$ are hydrogen, halogen, nitro, alkyl or 1 to 4 carbons or alkoxy of 1 to 4 carbons; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage.

25. The process of claim 24 further characterized in that the inert pigment is present at a level of about 0.25 to 2.0 parts inert to each part of the pigment formed by the reaction of the heteropoly acid and the aryl pararosaniline.

* * * * *